US 7,528,831 B2

(12) United States Patent
Hong et al.

(10) Patent No.: US 7,528,831 B2
(45) Date of Patent: May 5, 2009

(54) GENERATION OF TEXTURE MAPS FOR USE IN 3D COMPUTER GRAPHICS

(75) Inventors: Qi He Hong, Guildford (GB); Adam Michael Baumberg, Guildford (GB); Alexander Ralph Lyons, Cambridge (GB)

(73) Assignee: Canon Europa N.V., Amstelveen (NL)

( * ) Notice: Subject to any disclaimer, the term of this patent is extended or adjusted under 35 U.S.C. 154(b) by 455 days.

(21) Appl. No.: 10/943,103

(22) Filed: Sep. 17, 2004

(65) Prior Publication Data

US 2005/0151751 A1 Jul. 14, 2005

(30) Foreign Application Priority Data

Sep. 18, 2003 (GB) ................................. 0321888.0

(51) Int. Cl.
*G06T 15/20* (2006.01)
(52) U.S. Cl. ...................... 345/420; 345/426; 345/582; 345/589
(58) Field of Classification Search ................. 345/581, 345/582, 427, 629, 420, 426, 589
See application file for complete search history.

(56) References Cited

U.S. PATENT DOCUMENTS

| | | | |
|---|---|---|---|
| 6,356,272 B1 * | 3/2002 | Matsumoto et al. .......... | 345/582 |
| 6,516,099 B1 | 2/2003 | Davison et al. ............. | 382/284 |
| 6,525,731 B1 * | 2/2003 | Suits et al. .................. | 345/427 |
| 6,639,594 B2 * | 10/2003 | Zhang et al. ................. | 345/426 |
| 6,647,146 B1 | 11/2003 | Davison et al. ............. | 382/199 |
| 6,668,082 B1 | 12/2003 | Davison et al. ............. | 382/190 |
| 6,791,540 B1 | 9/2004 | Baumberg .................. | 345/419 |
| 2002/0061130 A1 | 5/2002 | Kirk et al. ................... | 382/154 |
| 2002/0085748 A1 | 7/2002 | Baumberg ................... | 382/154 |
| 2002/0186216 A1 | 12/2002 | Baumberg et al. .......... | 345/422 |
| 2002/0190982 A1 | 12/2002 | Kotcheff et al. ............. | 345/420 |
| 2003/0001837 A1 | 1/2003 | Baumberg ................... | 345/419 |

(Continued)

FOREIGN PATENT DOCUMENTS

EP 1 204 073 A2 5/2002

(Continued)

OTHER PUBLICATIONS

"Creating View-dependent Texture Maps", printed from http://citeseer.nj.nec.com/483030.html during the period Jun. 26, 2003-Sep. 18, 2003.

(Continued)

*Primary Examiner*—Kimbinh T Nguyen
(74) *Attorney, Agent, or Firm*—Fitzpatrick, Cella, Harper & Scinto

(57) ABSTRACT

A plurality of texture maps for a 3D computer model of an object are generated by processing images of the object, data defining the computer model, and data defining the relative positions and orientations of the images and computer model. A respective texture map is generated for the viewing position and direction of each image. Each texture map stores texture data for all parts of the computer model which are visible from the associated viewing position and direction and also texture data for all invisible parts of the computer model. Each texture map therefore stores texture data that can be used for rendering accurate images of the 3D computer model over a wide range of viewing positions and directions.

35 Claims, 6 Drawing Sheets

U.S. PATENT DOCUMENTS

Figure 1:
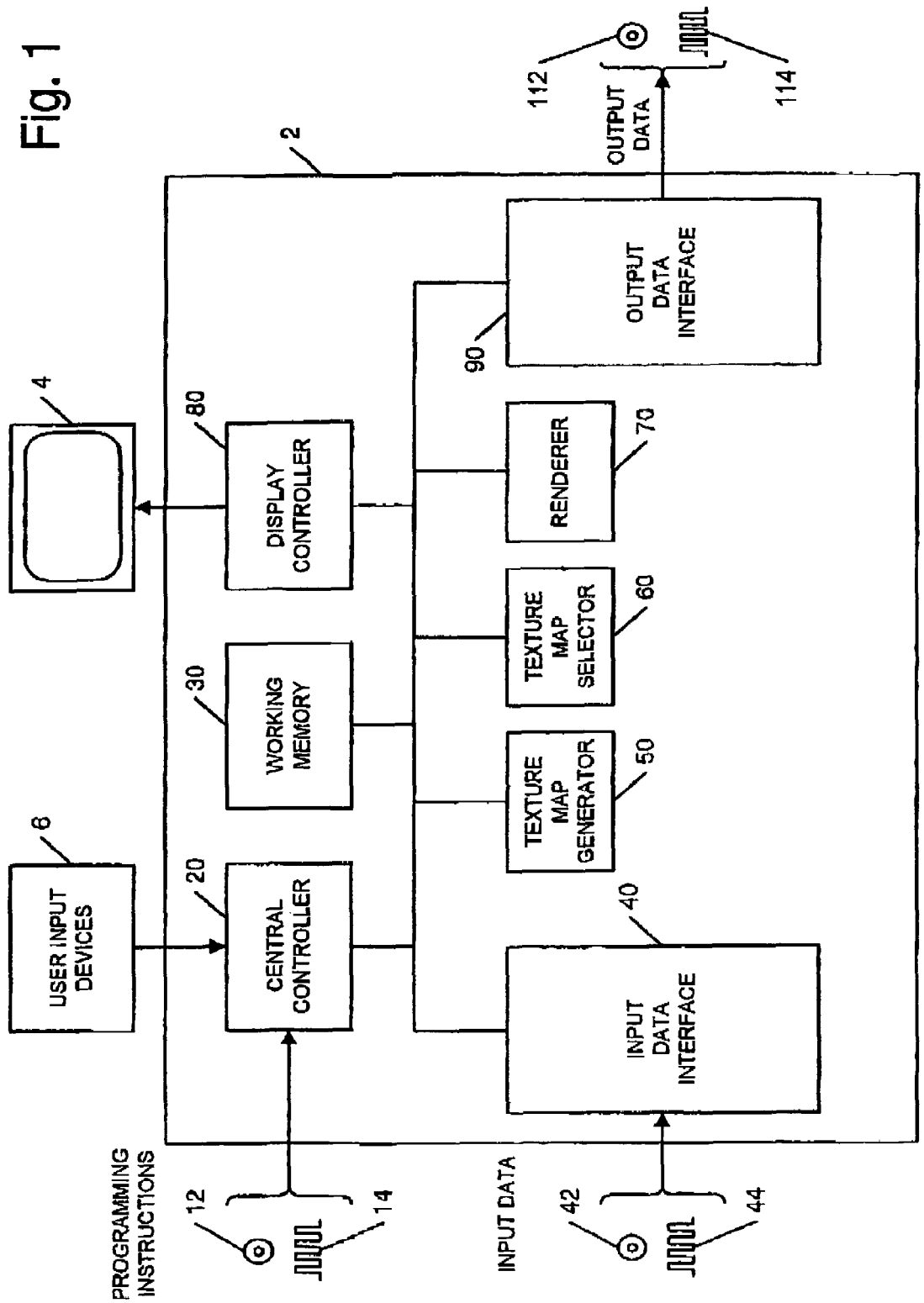

| | | | |
|---|---|---|---|
| 2003/0063086 A1 | 4/2003 | Baumberg | 345/420 |
| 2003/0085890 A1 | 5/2003 | Baumberg et al. | 345/420 |
| 2003/0085891 A1 | 5/2003 | Lyons et al. | 345/420 |
| 2003/0160785 A1 | 8/2003 | Baumberg | 345/419 |
| 2003/0189567 A1 | 10/2003 | Baumberg | 345/419 |
| 2003/0218607 A1 | 11/2003 | Baumberg | 345/419 |
| 2004/0104916 A1 | 6/2004 | Hong et al. | 345/582 |
| 2004/0155877 A1 | 8/2004 | Hong et al. | 345/419 |
| 2004/0196294 A1 | 10/2004 | Hong et al. | 345/582 |
| 2004/0247174 A1 | 12/2004 | Lyons et al. | 382/154 |

FOREIGN PATENT DOCUMENTS

| | | |
|---|---|---|
| EP | 1 267 309 A2 | 12/2002 |
| GB | 2 362 793 A | 11/2001 |
| GB | 2 377 870 A | 1/2003 |
| WO | 01/39124 A2 | 5/2001 |

OTHER PUBLICATIONS

Richard I. Hartley, "Euclidean Reconstruction from Uncalibrated Views". Applications of Invariance in Computer Vision, Azores, 1993, pp. 237-255.

Makoto Maruya, "Generating a Texture Map from Object-Surface Texture Data", Eurographics '95, vol 14, (1995), No. 3, pp. C387-C405.

Ko Nishino et al., "Eigen-Texture Method: Appearance Compression and Synthesis Based on a 3D Model", IEEE Transactions on Pattern Analysis and Machine Intelligence. vol. 23, No. 11, Nov. 2001, pp. 1257-1265.

Wojciech Matusik et al., "Image-Based 3D Photography Using Opacity Hulls", Proceedings SIGGRAPH 2002, pp. 427-437.

Marcus Magnor et al. Multi-View Coding for Image-Based Rendering Using 3-D Scene Geometry, IEEE Transaction on Circuits and Systems for Video Technology. vol. 13, No. 11, Nov. 2003, pp. 1092-1106.

* cited by examiner

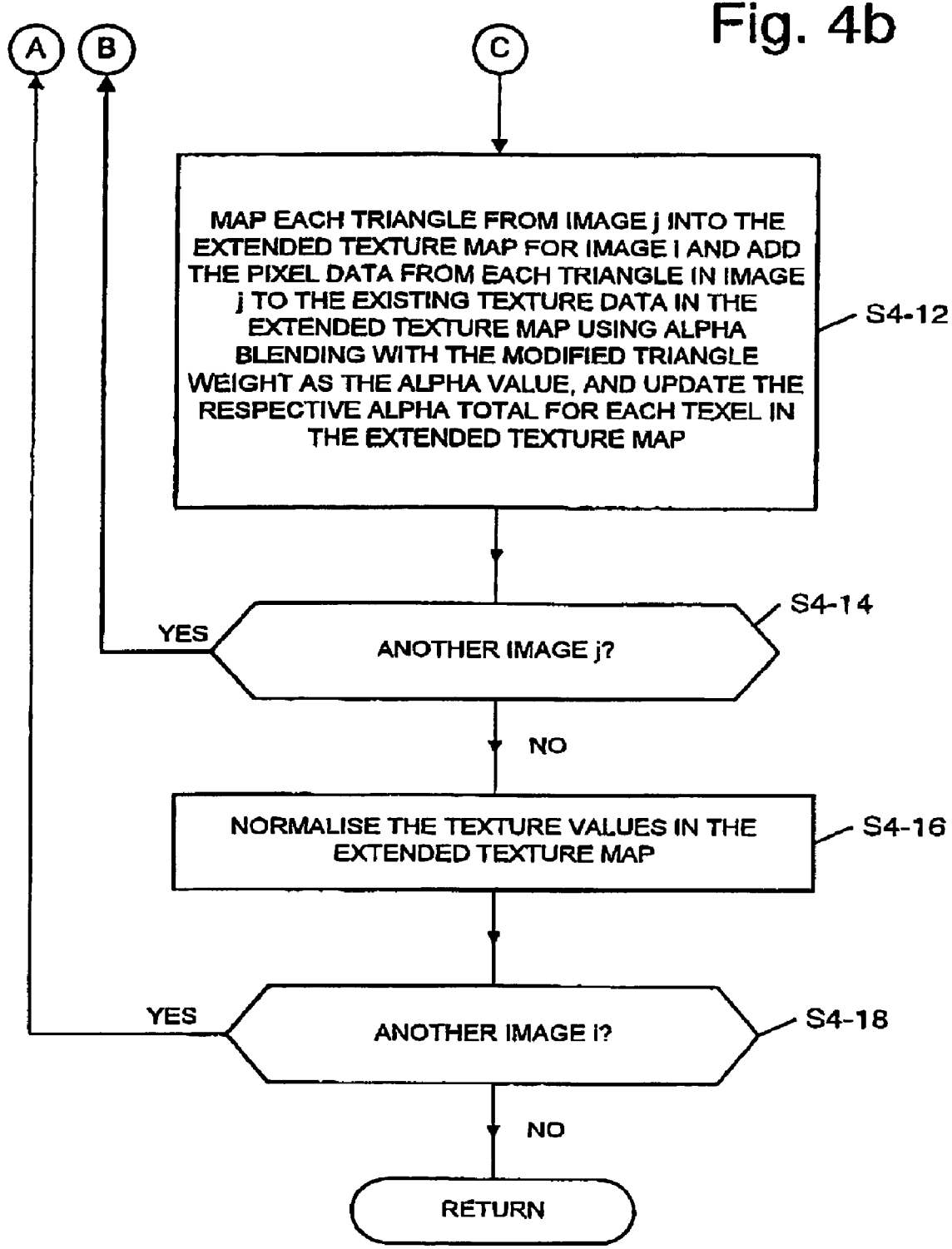

GENERATION OF TEXTURE MAPS FOR USE IN 3D COMPUTER GRAPHICS

This application claims the right of priority under 35 U.S.C. § 119 based on British Patent Application Number 0321888.0, filed 18 Sep. 2003, which is hereby incorporated by reference herein in its entirety as if fully set forth herein.

The present invention relates to the field of three-dimensional (3D) computer graphics, and more particularly to the generation of texture maps for use in rendering images of a three-dimensional computer model.

The technique of texture mapping is well known in the field of 3D computer graphics. In this technique, an image (either a digitised camera image or a synthetic image) known as a "texture map" is stored and mapped on to one or more surfaces of a three-dimensional computer model during rendering to represent surface detail in the final image of the model. The texture map is made up of a two-dimensional matrix of individual elements known as "texels" (like the pixels of an image) and, typically, a respective red, green and blue value is stored for each texel to define the texture data in the texture map.

Coordinates defining a point in the texture map are assigned to each vertex of each polygon in the 3D computer model. In this way the assigned texture map coordinates for a polygon's vertices define a corresponding polygon in the texture map containing the texture data which is to be mapped on to the 3D model polygon during rendering. The texture data assigned to each polygon in the 3D computer model is therefore constant, and so the same texture data is applied to a polygon for every viewing position and direction from which the polygon is rendered.

A problem occurs, however, when the texture data in the texture map is real image data from one or more camera images.

More particularly, the illumination, shadows and reflections in a real camera image are only correct for one particular viewing position and direction (that is, those from which the image was recorded relative to the object and the scene light sources). When the viewing position and direction from which the 3D computer model is viewed changes, the viewer would expect to see the illumination, shadows and reflections in the rendered image change accordingly. However, because the same texture data is mapped onto the 3D computer model regardless of the viewing position and direction, these changes are not seen and instead the viewer sees errors in the rendered images. These errors are particularly noticeable when there is a significant variation in the lighting intensity and distribution in the camera image(s) used to generate the texture data, and/or when the object has regions of highlights or self-shadows.

To address this problem, so-called "view-dependent texture mapping" has been proposed. In this technique, the vertices of each polygon in the 3D computer model are mapped into a plurality of camera images recorded from different viewing positions and directions to provide texture data. Accordingly, texture data from a plurality of respective camera images is available for each polygon. The image to be used to provide texture data for a particular virtual image is selected in dependence upon the relationship between the viewing position and direction of the virtual image and the viewing positions and directions of the camera images.

One problem which occurs in conventional view-dependent texture mapping techniques, however, is that each camera image can only be used to generate texture data for polygons in the 3D computer model that are visible in the image. When a virtual image of the 3D computer model is rendered from a viewing position and direction different to that of a camera image, polygons will be visible in the virtual image which are not visible in the camera image and for which the camera image does not store texture data. Accordingly, post-processing is performed after rendering to identify polygons onto which no texture data was rendered, and to generate texture data for these polygons. The generation of texture data is performed by extrapolation of existing texture data in the rendered image or by performing processing to identify another camera image in which the polygon for which texture data is missing is visible and to extract texture data therefrom (this processing having to be performed many times because many polygons typically do not have texture data after the initial rendering). The identification of polygons not having texture data after the initial rendering and the generation of texture data therefor is very time-consuming, resulting in a large amount of time being required to produce the final image. In addition, errors are often noticeable in the texture data generated subsequent to the initial rendering because the texture data is taken from at least one different camera image or is an extrapolation of existing rendered texture data.

The present invention aims to address at least one of the problems above.

According to the present invention, there is provided a 3D computer graphics processing method and apparatus for generating texture maps for a 3D computer model of an object containing texture data derived from images of the object. A plurality of texture maps are generated, each respective texture map being generated for a respective viewing direction and each respective texture map storing texture data not only for the parts of the 3D computer model visible from its viewing direction, but also texture data for some or all invisible parts as well.

The resulting respective texture map for each viewing direction therefore contains sufficient texture data to generate a high quality rendered image of the 3D computer model from a different viewing direction without having to perform post-processing after the image has been rendered Consequently, high quality rendered images can be generated quickly from viewing positions and/or directions different to those for which the texture maps were generated.

The viewing directions for which the texture maps are generated may comprise the viewing directions of the images from which the texture data is derived.

The texture map can be rendered using conventional texture mapping techniques, and therefore facilitates fast rendering in real-time.

The present invention also provides a 3D computer graphics rendering method and apparatus in which an image of a 3D computer model is rendered using a texture map selected from a plurality of texture maps, each texture map being associated with a respective viewing direction and each texture map storing texture data for both visible and some or all non-visible parts of the 3D computer model from the associated viewing direction.

The rendering may be performed using only the texture data from the selected texture map because each texture map stores all of the necessary texture data and it is unnecessary to generate any further texture data.

The present invention also provides a computer program product, embodied for example as a storage device carrying instructions or a signal carrying instructions, comprising instructions for programming a programmable processing apparatus to become operable to perform a method as set out above or to become configured as an apparatus as set out above.

Figure 2:
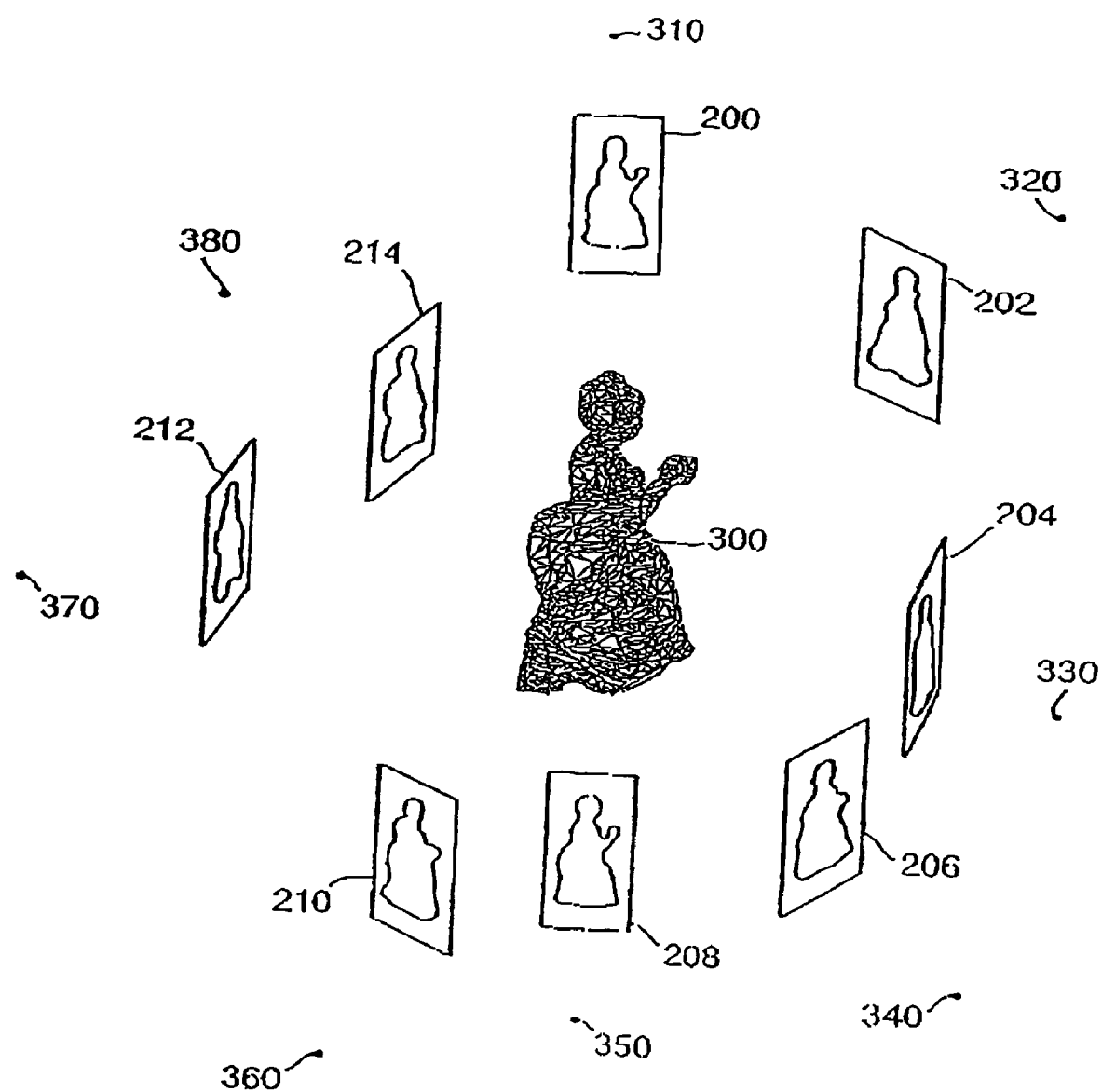
Figure 3A:
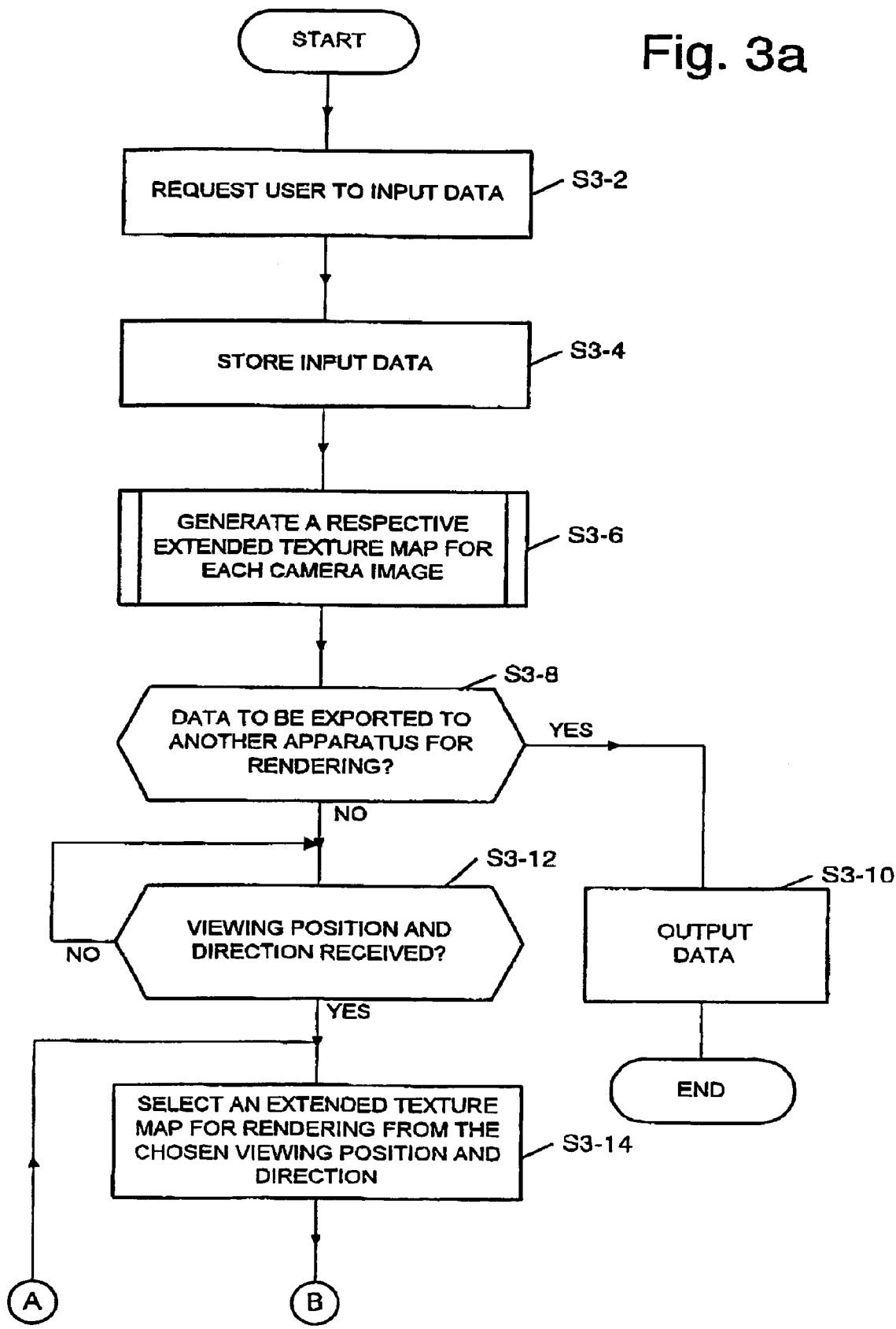
Figure 3B:
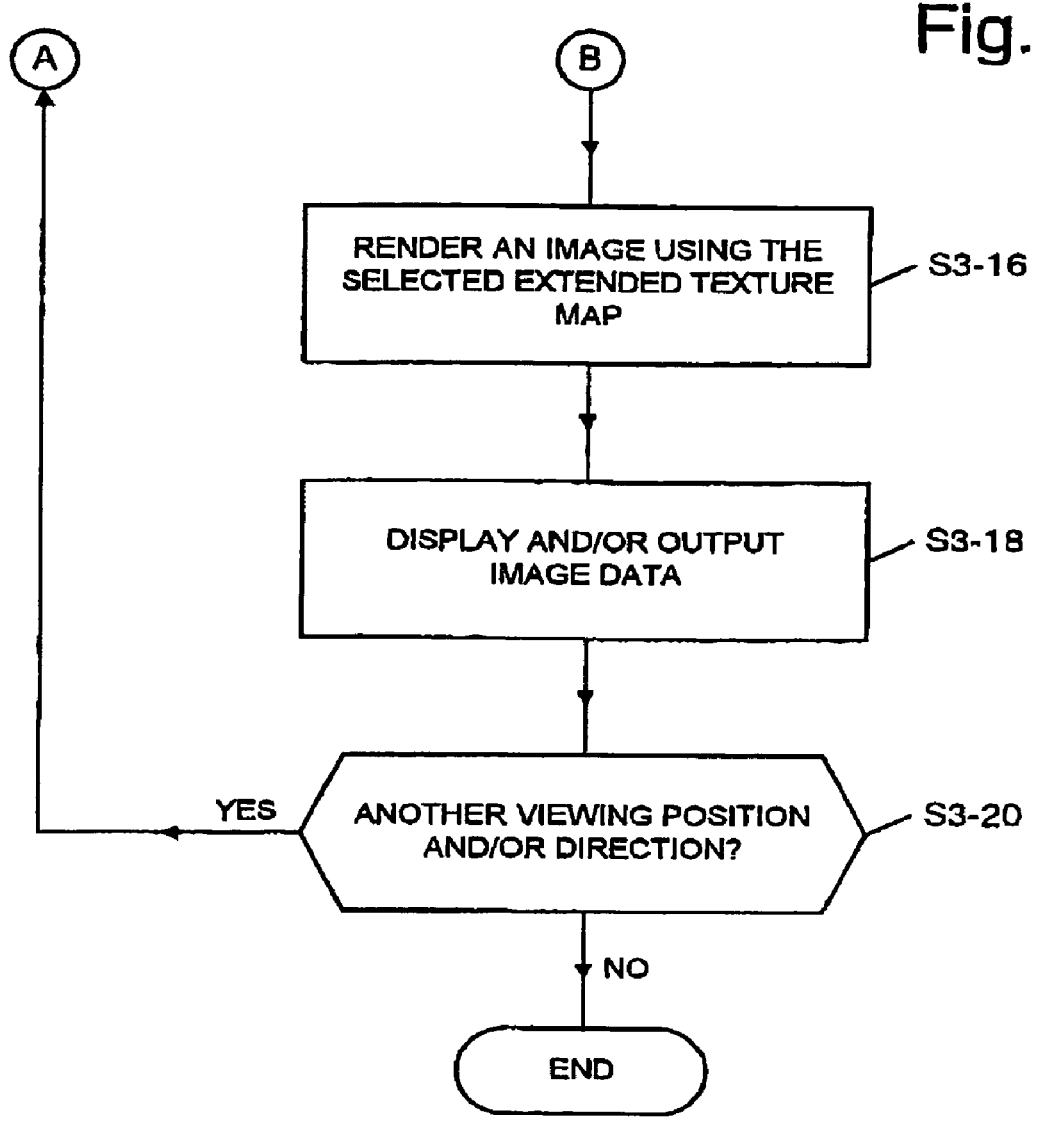
Figure 4A:
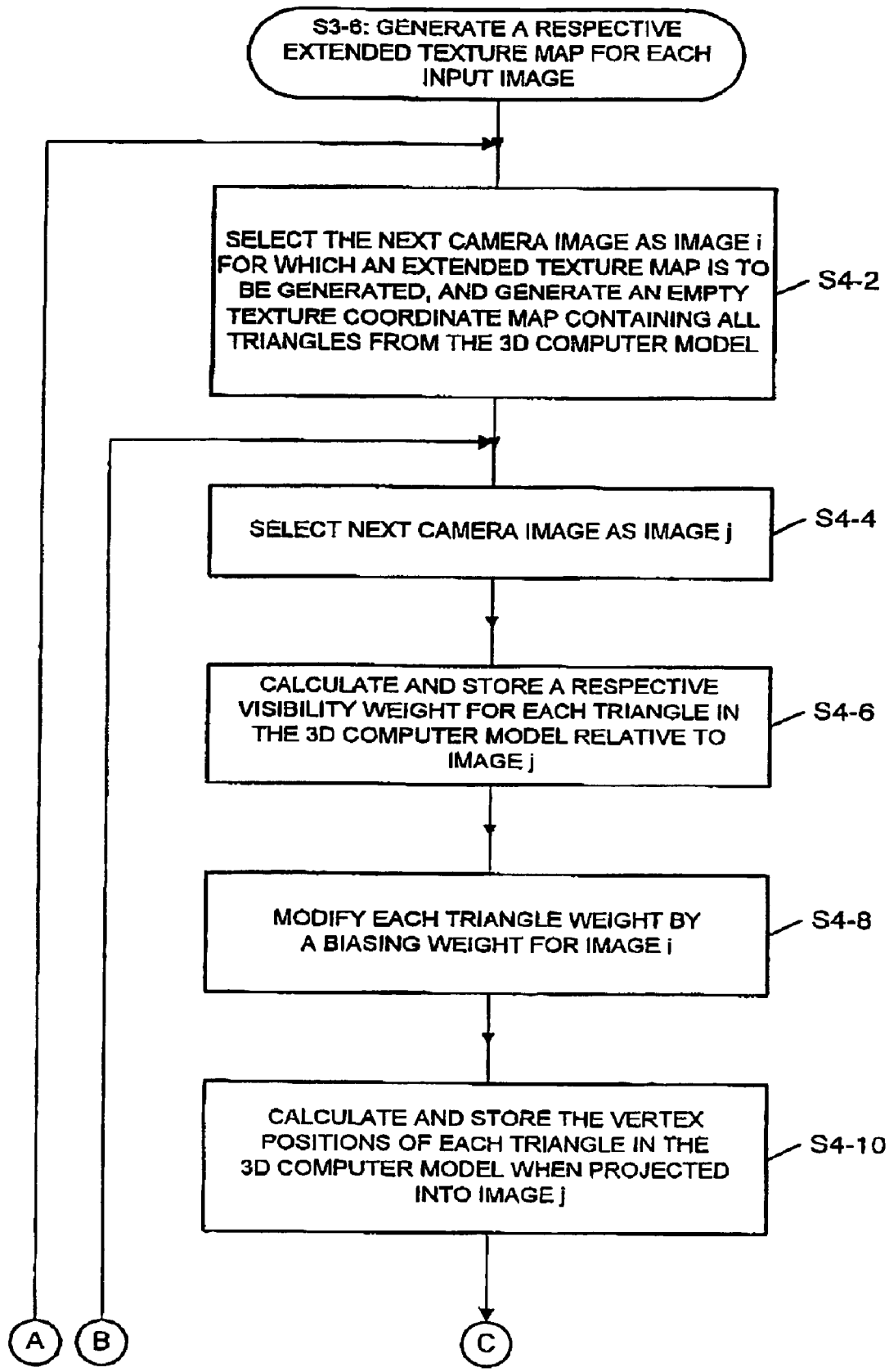

Embodiments of the invention will now be described, by way of example only, with reference to the accompanying drawings, in which:

FIG. 1 schematically shows the components of an embodiment of the invention, together with the notional functional processing units into which the processing apparatus component may be thought of as being configured when programmed by computer program instructions;

FIG. 2 shows an example to illustrate the data input to the processing apparatus in FIG. 1 to be processed to generate texture maps for a 3D computer model;

FIG. 3, comprising FIGS. 3a and 3b, shows the processing operations performed by the processing apparatus in FIG. 1; and FIG. 4, comprising FIGS. 4a and 4b, shows the processing operations performed at step S3-6 in FIG. 3.

Referring to FIG. 1, an embodiment of the invention comprises a programmable processing apparatus 2, such as a personal computer (PC), containing, in a conventional manner, one or more processors, memories, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium 12 (such as an optical CD ROM, semiconductor ROM, magnetic recording medium, etc), and/or as a signal 14 (for example an electrical or optical signal input to the processing apparatus 2, for example from a remote database, by transmission over a communication network (not shown) such as the Internet or by transmission through the atmosphere), and/or entered by a user via a user input device 6 such as a keyboard.

As will be described in more detail below, the programming instructions comprise instructions to program the processing apparatus 2 to become configured to generate a plurality of so-called "extended" texture maps for a 3D computer model of a subject object by processing, inter alia, data defining images of the subject object recorded at different relative positions and orientations, data defining the 3D computer model, and data defining the relative positions and orientations of the images and the 3D computer model. More particularly, a respective extended texture map is generated for the viewing position and direction of each camera image. Each extended texture map stores texture data for all parts of the 3D computer model which are visible from the associated viewing position and direction (this texture data being derived primarily from the corresponding camera image) and also texture data for all invisible parts of the 3D computer model. Each extended texture map therefore stores texture data that can be used for rendering accurate images of the 3D computer model over a wide range of viewing positions and directions in the vicinity of the viewing position and direction of the camera image corresponding to the texture map. When rendering of a virtual image of the 3D computer model is to be performed, one extended texture map is selected by comparing the viewing parameters of the virtual image to be generated with those of the camera images for which extended texture maps are stored, and the image is rendered using the texture data from only the selected extended texture map (because each extended texture map stores texture data for every part of the 3D computer model and so texture data is available even for those parts of the 3D computer model which are not visible in the camera image corresponding to the texture map but which are visible in the virtual image). As a result, the set of extended texture maps allows one texture map to be selected to render quickly an accurate image of the 3D computer model for any viewing position and direction.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional, and are shown for illustration purposes only to assist understanding; they do not necessarily represent units and connections into which the processor, memory etc of the processing apparatus 2 actually become configured.

Referring to the functional units shown in FIG. 1, central controller 20 is operable to process inputs from the user input devices 6, and also to provide control and processing for the other functional units. Memory 30 is provided for use by central controller 20 and the other functional units.

Input data interface 40 is operable to control the storage of input data within processing apparatus 2. The data may be input to processing apparatus 2 for example as data stored on a storage medium 42, as a signal 44 transmitted to the processing apparatus 2, or using a user input device 6.

In this embodiment, the input data comprises data defining a plurality of camera images of a subject object recorded at different relative positions and orientations, data defining a 3D computer model of the surface of the subject object, and data defining the relative 3D positions and orientations of the camera images and the 3D computer surface model. In addition, in this embodiment, the input data also includes data defining the intrinsic parameters of each camera which recorded an image, that is, the aspect ratio, focal length, principal point (the point at which the optical axis intersects the imaging plane), first order radial distortion coefficient, and skew angle (the angle between the axes of the pixel grid; because the axes may not be exactly orthogonal).

Thus, referring to FIG. 2, the input data defines a plurality of camera images 200-214 and a 3D computer surface model 300 having positions and orientations defined in 3D space. In this embodiment, the 3D computer surface model 300 comprises a mesh of connected polygons (triangles in the embodiment) but other forms of 3D computer surface model may be processed, as will be described later. In addition, the input data defines the imaging parameters of the camera images 200-214, which includes, inter alia, the respective focal point position 310-380 in 3D space of each image.

The input data defining the camera images 200-214 of the subject object, the data defining the 3D computer surface model 300, and the data defining the positions and orientations of the images and 3D computer surface model may be generated in any of a number of different ways. For example, processing may be performed as described in WO-A-01/39124 or EP-A-1,267,309.

The input data defining the intrinsic camera parameters may be input, for example, by a user using a user input device 6.

Referring again to FIG. 1, texture map generator 50 is operable to process the input data to generate a plurality of view-dependent texture maps comprising a respective texture map for each camera image. Each texture map stores texture data not only for the polygons in the 3D computer model 300 that are visible from the viewing position and direction of the corresponding camera image, but also texture data for other polygons. Accordingly, each texture map generated by texture map generator 50 is referred to as an "extended" texture map.

Texture map selector 60 is operable to select an extended texture map generated by texture map generator 50 for rendering in accordance with the viewing position and direction from which a virtual image of the 3D computer model 300 is to be rendered.

Renderer 70 is operable to render a virtual image of the 3D computer surface model using the extended texture map selected by texture map selector 60.

Display controller 80, under the control of central controller 20, is operable to control display device 4 to display image data generated by renderer 70 and also to display instructions to the user.

Output data interface 90 is operable to control the output of data from processing apparatus 2. In this embodiment, the output data defines the 3D computer surface model 300 and the extended texture maps generated by texture map generator 50, together with data defining the respective viewing position and direction for which each extended texture map was generated. In addition or instead, the output data comprises the image data generated by renderer 70. Output data interface 90 is operable to output the data for example as data on a storage medium 112 (such as an optical CD ROM, semiconductor ROM, magnetic recording medium, etc), and/or as a signal 114 (for example an electrical or optical signal transmitted over a communication network such as the Internet or through the atmosphere). A recording of the output data may be made by recording the output signal 114 either directly or indirectly (for example by making a first recording as a "master" and then making a subsequent recording from the master or from a descendent recording thereof) using a recording apparatus (not shown).

FIG. 3 shows the processing operations performed by processing apparatus 2 to process input data in this embodiment.

Referring to FIG. 3, at step S3-2, central controller causes display controller 80 to display a message on display device 4 requesting the user to input data for processing.

At step S3-4, data as described above, input by the user in response to the request at step S3-2, is stored in memory 30.

At step S3-6, texture map generator 50 processes the input data stored at step S3-4 to generate a respective extended texture map for each camera image 200-214 in the input data.

FIG. 4 shows the processing operations performed by texture map generator 50 at step S3-6.

Referring to FIG. 4, at step S4-2, texture map generator 50 selects the next camera image 200-214 as image "i" for which an extended texture map is to be generated, and generates an empty texture coordinate map comprising a two-dimensional (2D) rectangle in which is defined a respective triangle for each triangle in the 3D computer model 300. Each triangle in the texture coordinate map will subsequently store texture data for the corresponding triangle in the 3D computer model 300. The term "texture coordinate map" is used because coordinates for the vertices of each respective triangle in the 3D computer model 300 are stored therein.

The processing to generate the texture coordinate map at step S4-2 may be performed in a number of ways, for example as described in "Generating a Texture Map from Object-Surface Texture Data" by Maruya in EUROGRAPHICS '95, vol. 14, 1995, November 3, pages C387 to C405, or as described in the proprietor's co-pending U.S. patent application Ser. No. 10/685,606 (the full contents of which are incorporated herein by cross-reference).

At step S4-4, texture map generator 50 selects the next camera image stored at step S3-4 as image "j". It should be noted that every camera image stored at step S3-4 is available for selection at step S4-4 and accordingly, on one iteration, image j will be the same as image i selected at step S4-2.

At step S4-6, texture map generator 50 calculates and stores a respective visibility weight for each triangle in the 3D computer model 300 in dependence upon the orientation of the triangle relative to image j selected at step S4-4. More particularly, to calculate each respective weight in this embodiment, texture map generator 50 calculates the dot product of the triangle normal vector (that is, a vector perpendicular to the plane of the triangle) with the vector defining the viewing direction of the camera for image j. The resulting value is then stored as the weight for the triangle, unless the value is negative, in which case a weight of zero is stored for the triangle. A weight is calculated in this way for each triangle in the 3D computer model 300. Each weight calculated at step S4-6 is therefore a measure of the visibility of the corresponding triangle in image j (ignoring occlusions).

At step S4-8, texture map generator 50 modifies each triangle weight calculated at step S4-6 by a biasing weight to ensure that image data from image i contributes more to the texture data in the extended texture map for image i than image data from any other respective image. More particularly, texture map generator 50 modifies each triangle weight by a measure of the similarity of the view of the 3D computer model 300 available in image i and the view of the 3D computer model 300 available in image j.

To modify a triangle weight in this embodiment, texture map generator 50 multiplies the weight by the value 1.0 if image i is the same as image j, and multiplies the triangle weight by the value 0.1 if image i is not the same as image j. The triangle weights may be modified in other ways, however. For example, each triangle weight may be modified in dependence upon the relative viewing directions of image i and image j by multiplying each triangle weight by the value resulting from the dot product of the viewing direction of image i and the viewing direction of image j. In addition, each triangle weight may be modified in dependence upon the relative viewing positions of image i and image j by dividing each triangle weight by the distance between the viewing position of image i and the viewing position of image j.

As a result of the modification at step S4-8, the triangle weights are biased to have a relatively high value if image i is equal to image j (or if the viewing direction of image i is close to the viewing direction of image j if modification using the dot product of the viewing directions is used as described above).

At step S4-10, texture map generator 50 calculates and stores the vertex positions of each triangle in the 3D computer model 300 then projected into image j. In this embodiment, the processing at step S4-10 is performed using open GL perspective projection to project the triangles from the 3D computer model into the 2D image j.

At step S4-12, texture map generator 50 maps each triangle defined by the vertex projections at step S4-10 from image j into the texture coordinate map for image i generated at step S4-2. In addition, texture map generator 50 adds the pixel data from each triangle in image j to the existing texture data for the texels in the texture coordinate map onto which the triangle maps. The addition of the pixel data from image j to the existing texture data in the extended texture map is performed using α blending with the modified triangle weight calculated at step S4-8 being used as the α value. This processing is performed in this embodiment using Open GL texture mapping and Open GL α blending.

As a result of the processing at step S4-12, the red (R), green (G) and blue (B) texture data stored for a texel in the extended texture map is given by:

$$R = R_T + \alpha R_j \quad (1)$$

$$G = G_T + \alpha G_j \quad (2)$$

$$B = B_T + \alpha B_j \quad (3)$$

where $R_T$, $G_T$, $B_T$ are the R,G,B values stored in the texture coordinate map before the addition of data from the currently selected image j;

$\alpha$ is the modified a value calculated at step S4-8 for the triangle in which the pixel in image j lies;

$R_j$, $G_j$, $B_j$ are the R,G,B values of the pixel data in image j.

Texture map generator 50 maintains a respective $\alpha$ value total for each texel in the extended texture map, and this total is updated at step S4-12 by adding any $\alpha$ value used to update the texture data for that texel.

At step S4-14, texture map generator 50 determines whether every camera image stored at step S3-4 has been processed as image j. Steps S4-4 to S4-14 are repeated until every camera image has been processed as image j.

At step S4-16, texture map generator 50 normalises the texture values stored in the extended texture map. More particularly, for each texel in the extended texture map, texture map generator 50 divides the respective R, G and B values by the $\alpha$ value total for that texel.

At step S4-18, texture map generator 50 determines whether every camera image stored at step S3-4 has been processed as image i. Steps S4-2 to S4-18 are repeated until every camera image has been processed as image i.

As a result of this processing, a respective extended texture map is generated for each camera image stored at step S3-4. Each extended texture map stores texture data for all triangles in the 3D computer model—that is, triangles that are completely visible, triangles that are partially visible and triangles that are invisible from the viewing position and direction of the corresponding camera image. The texture data for each triangle comprises a blend of texture data from different camera images. However, the texture data for the triangles that are visible in the corresponding camera image is derived primarily from that camera image (as a result of the modification of the triangle weights at step S4-8).

Referring again to FIG. 3, at step S3-8, central controller 20 determines whether data defining the extended texture maps generated at step S3-6 is to be exported to a different apparatus for rendering.

If it is determined at step S3-8 that the data is to be exported, then processing proceeds to step S3-10, at which output data interface 90 outputs data stored on a storage medium 112 or carried by a signal 114 for receipt by the separate apparatus. The output data defines the 3D computer surface model 300, the extended texture maps generated by texture map generator 50 at step S3-6, and the respective viewing position and direction of each camera image to which each extended texture map corresponds.

On the other hand, if it is determined at step S3-8 that the data is not to be exported, then processing is carried out at steps S3-12 to S3-20 to perform rendering within processing apparatus 2. (It should be noted that these are the same processing operations as those performed by a separate apparatus using the data output at step S3-10 if data is output from processing apparatus 2 for rendering.)

More particularly, at step S3-12, central controller 20 determines whether a viewing position and direction from which a virtual image of the 3D computer model 300 is to be rendered has been defined. The viewing position and direction may be defined, for example, by a user in a conventional way using a user input device 6 such as a mouse and/or a keyboard.

In response to the entry of a viewing position and direction, processing proceeds to step S3-14, at which texture map selector 60 selects one of the extended texture maps generated by texture map generator 50 at step S3-6 for rendering an image of the 3D computer model 300 from the chosen viewing position and direction. More particularly, in this embodiment, texture map selector 60 calculates the respective dot product of the viewing direction entered by the user and the viewing direction of each camera image stored at step S3-4. The extended texture map corresponding to the camera image for which the dot product value is largest is then selected for rendering.

At step S3-16, renderer 70 renders an image of the 3D computer model 300 from the viewing position and direction entered by the user using the extended texture map selected by texture map selector 60 at step S3-14. This rendering is performed in a conventional way. Because the selected extended texture map contains texture data for all triangles in the 3D computer model 300, texture data is available for rendering even for triangles that are visible in the rendered image but not in the camera image associated with the selected extended texture map. Consequently, rendering can be performed in one pass using the texture data from the selected extended texture map, and no post-processing of the rendered data is necessary.

At step S3-18, central controller 20 controls display controller 80 to display the image data generated at step S3-16 on display device 4. In addition or instead, the image data generated at step S3-16 is output by output data interface 90 as data stored on a storage medium 112 or as data carried by a signal 114.

At step S3-20, central controller 20 determines whether a new viewing position and/or direction has been entered by the user for rendering an image of the 3D computer model 300. Steps S3-14 to S3-20 are repeated until images of the 3D computer model 300 have been rendered from all desired viewing positions and directions.

Many modifications and variations can be made to the embodiment described above within the scope of the accompanying claims.

For example, in the embodiment described above, the 3D computer surface model 300 stored at step S3-4 comprises a plurality of vertices in 3D space connected to form a polygon mesh. However, different forms of 3D computer surface model may be processed to generate extended texture maps therefor. For example, a 3D surface defined by a "point cloud" representation (comprising unconnected points in 3D space representing points on the object surface and a respective surface normal vector for each point) may be processed. In this case, each point in the point cloud can be thought of as an infinitely small triangle so that the same processing as that performed in the embodiment above is carried out to generate an extended texture map for the point cloud representation. In the extended texture map, the texture data comprises a respective red, green and blue value for each 3D point in the point cloud. Accordingly, each texture map comprises a list of red, green and blue values, such that the texture map can be considered to be one-dimensional (instead of a two-dimensional array of texels as in the embodiment). Consequently, the term "texture map" will be understood to include such a list of red, green and blue values associated with 3D points as well as any other form of texture map.

In the embodiment described above, each extended texture map contains texture data for every triangle in the 3D computer model 300—that is, texture data for every triangle that is completely visible from the viewing position and direction of the corresponding camera image, texture data for every triangle that is partially visible from the viewing position and direction of the corresponding camera image, and texture data for every triangle that is invisible from the viewing position and direction of the corresponding camera image. However, as a modification, texture data for triangles that are unlikely to be visible in any virtual image rendered using a particular extended texture map may be omitted from the extended texture map. By way of example, for a particular extended texture map, the three camera images stored at step S3-4 nearest to the camera image corresponding to the extended texture map may be identified, and each triangle which is not visible in the camera image corresponding to the extended texture map or the identified nearest three camera images may be omitted from the texture coordinate map generated at step S4-2 so that the extended texture map does not store texture data for these triangles. In this way, the extended texture map will still contain texture data for all triangles which are completely or at least partially visible from the viewing position and direction of the corresponding camera image and also texture data for triangles which are invisible from the viewing position and direction of the corresponding camera image but which may be visible in virtual images rendered from a viewing position and/or direction close to the viewing position and direction of the corresponding camera image. However, storage requirements are reduced because texture data is not stored in the extended texture map for each triangle that will be invisible in any virtual image rendered using the extended texture map. (In this regard, it is noted that if a virtual image is to be rendered of a view of the 3D computer model 300 that is significantly different to the view in the camera image corresponding to the extended texture map then the extended texture map will not be selected for rendering at step S3-14 and instead an extended texture map having a more similar view will be selected. Accordingly each extended texture map does not need to store texture data for every triangle in the 3D computer model 300—only those that will be visible in views for which the extended texture map will be selected for rendering. Consequently, the more camera images 200-214 that are stored at step S3-4, the fewer the triangles for which each extended texture map has to store texture data.)

In the embodiment described above, a respective extended texture map is generated for each camera image 200-214 stored at step S3-4. Accordingly, each extended texture map is associated with the viewing position and direction of a camera image 200-214. However, one or more extended texture maps may be generated for viewing positions and/or directions different from those of the camera images. By way of example, instead of generating a respective extended texture map for the viewing position and direction of each input image 200-214, a respective extended texture map may be generated for a viewing position and direction mid-way between the viewing position and direction of each adjacent pair of camera images. In this case, each triangle weight would be biased equally for each image in the pair at step S4-8 by multiplying the triangle visibility weight calculated at step S4-6 by 1.0 if image j is an image in the pair and by 0.1 otherwise. Extended texture maps could, of course, be generated for other viewing positions and directions.

In the embodiment above, the respective visibility weight for each triangle in the 3D computer model 300 may be calculated at step S4-6 taking into account occlusions by other triangles from the viewing position and direction of image j. For example, each visibility weight calculated at step S4-6 may be multiplied by a value between 0 and 1 defining the proportion of the triangle that is visible in image j. The proportion of each triangle that is visible may be calculated, for example, as described in EPC application EP-A-1,204,073 and co-pending US application US 20020085748 A1 (the full contents of which are incorporated herein by cross-reference).

In the embodiment described above, the texture data in an extended texture map for triangles that are visible in the corresponding camera image is based primarily on the image data in that camera image but also, to a less extent, on the image data in other camera images. However, instead, the texture data in an extended texture map for triangles that are completely visible in the corresponding camera image may be derived solely from the image data in that camera image without any contribution from the image data in other camera images. This may be achieved, for example, by modifying each triangle weight at step S4-8 such that the triangle weight is multiplied by the value 1.0 if image i is the same as image j, multiplying the weight of each triangle that is visible in image i by the value 0.0 if image i is not the same as image j, and multiplying the weight of each triangle that is not visible in image i by the dot product of the viewing directions of image i and image j if image i is not the same as image j. The triangles in the 3D computer model 300 that are visible in a particular camera image may be identified, for example, as described in EPC application EP-A-1,204,073 and co-pending US application US 20020085748 A1 (the full contents of which are incorporated herein by cross-reference).

In the embodiment described above, an extended texture map is selected for rendering at step S3-14 by calculating the respective dot product of the viewing direction for the virtual image entered by the user and each camera image viewing direction, and then selecting the extended texture map corresponding to the camera image having the largest calculated dot product. However, instead, an extended texture map may be selected for rendering by calculating the respective dot product of the viewing direction defined by the user with each camera image viewing direction (as in the embodiment described above), calculating the respective distance between the viewing position defined by the user and the viewing position of each camera image, dividing each dot product value by the corresponding distance (that is, the distance calculated for the same camera image), and selecting the extended texture map corresponding to the camera image having the largest resulting value. In this way, the extended texture map is selected in dependence upon not only viewing direction but also viewing position.

In the embodiment described above, at step S3-4, data input by a user defining the intrinsic parameters of the camera is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237-256, Azores 1993.

In the embodiments described above, processing is performed by a programmable computer using processing routines defined by programming instructions. However, some, or all, of the processing could, of course, be performed using hardware.

Other modifications are, of course, possible.

The invention claimed is:

1. A method of processing data defining a three-dimensional computer model of the surface of an object, image data defining a plurality of different images of the object, and data defining the position and direction of each image and the three-dimensional computer model, to generate texture data from the images for use in rendering an image of the three-dimensional computer model, the method comprising:

generating a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view, wherein the steps are performed on a computer.

2. A method according to claim 1, wherein a respective texture map is generated for each image, each texture map defining texture data for parts of the three-dimensional computer model that are visible in the corresponding image and at least some parts of the three-dimensional computer model that are not visible in the corresponding image.

3. A method according to claim 1, wherein each texture map is generated by combining image data from a plurality of the images.

4. A method according to claim 3, wherein each respective texture map is generated by:

calculating a respective measure of the visibility of each part of the three-dimensional computer model in each image; and generating texture data from the images for the parts of the three-dimensional computer model in dependence upon the calculated visibility measures.

5. A method according to claim 4, wherein the visibility measures are calculated taking into account occlusions of parts of the three-dimensional computer model by other parts.

6. A method according to claim 3, wherein each texture map is generated by combining image data from a plurality of images such that the contribution of image data from the image corresponding to the texture map is greater than the contribution of image data from any other respective image for at least some parts of the three-dimensional computer model.

7. A method according to claim 6, wherein the texture data for each respective texture map is generated such that the contribution of image data from the image corresponding to the texture map is greater than the contribution of image data from any other respective image for each part of the three-dimensional computer model that is visible in the corresponding image.

8. A method according to claim 1, wherein the texture data for each respective texture map is generated such that the texture data for parts of the three-dimensional computer model that are visible in the corresponding image is determined solely from the image data in the corresponding image.

9. A method according to claim 6, wherein each texture map is generated by:

calculating a respective measure of similarity of the view of the three-dimensional computer model available in the image corresponding to the texture map with the view of the three-dimensional computer model available in each other image; and generating texture data for the texture map from the images in dependence upon the calculated measures.

10. A method according to claim 4, wherein texture data is generated for each respective texture map by combining image data from the images in proportions dependent upon the calculated measures.

11. A method according to claim 1, wherein the three-dimensional computer model comprises a mesh of polygons, each polygon defining a part of the three-dimensional computer model, and wherein each generated texture map defines a two-dimensional array of texels together with colour component values for the texels and positions within the array of the vertices of the polygons comprising the parts of the three-dimensional computer model for which the texture map stores texture data.

12. A method according to claim 1, wherein the three-dimensional computer model comprises a plurality of unconnected points in three-dimensional space, each point defining a part of the three-dimensional computer model, and wherein each generated texture map defines colour component values for each point comprising a part of the three-dimensional computer model for which the texture map stores texture data.

13. A method according to claim 1, further comprising generating a signal carrying data defining the generated texture maps.

14. A method according to claim 1, further comprising making a direct or indirect recording of data defining the generated texture maps.

15. A method of generating texture data for use in rendering an image of a three-dimensional computer model, the method comprising:

storing data defining a three-dimensional computer model of the surface of an object, image data defining a plurality of different images of the object, and data defining the position and direction of each image and the three-dimensional computer model; and processing the data to generate a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view, wherein the steps are performed on a computer.

16. A method of rendering an image of a three-dimensional computer model, the method comprising:

receiving data defining a viewing position and direction from which the image is to be rendered;

selecting a texture map for rendering the image from among a plurality of texture maps, wherein each texture map is associated with a camera viewing position and direction and defines texture data for parts of the three-dimensional computer model that are visible from the associated viewing position and direction and at least some parts of the three-dimensional computer model that are not visible from the associated viewing position and direction, and wherein the selection of the texture map for rendering is made in dependence upon the received viewing direction and the viewing directions associated with the texture maps; and rendering an image of the three-dimensional computer model from the received viewing position and direction using texture data from the selected texture map to generate pixel data, wherein the steps are performed on a computer.

17. A method according to claim 16, further comprising generating a signal carrying the generated pixel data.

18. A method according to claim 16, further comprising making a direct or indirect recording of the generated pixel data.

19. Apparatus for processing data defining a three-dimensional computer model of the surface of an object, image data defining a plurality of different images of the object, and data defining the position and direction of each image and the three-dimensional computer model, to generate texture data from the images for use in rendering an image of the three-dimensional computer model, the apparatus comprising:

a texture map generator operable to generate a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view.

20. Apparatus according to claim 19, wherein the texture map generator is operable to generate a respective texture map for each image, each texture map defining texture data for parts of the three-dimensional computer model that are visible in the corresponding image and at least some parts of the three-dimensional computer model that are not visible in the corresponding image.

21. Apparatus according to claim 19, wherein the texture map generator is operable to generate each respective texture map by combining image data from a plurality of the images.

22. Apparatus according to claim 21, wherein the texture map generator is operable to generate each respective texture map by:
   calculating a respective measure of the visibility of each part of the three-dimensional computer model in each image; and
   generating texture data from the images for the parts of the three-dimensional computer model in dependence upon the calculated visibility measures.

23. Apparatus according to claim 22, wherein the texture map generator is operable to calculate the visibility measures taking into account occlusions of parts of the three-dimensional computer model by other parts.

24. Apparatus according to claim 21, wherein the texture map generator is operable to generate each texture map by combining image data from a plurality of images such that the contribution of image data from the image corresponding to the texture map is greater than the contribution of image data from any other respective image for at least some parts of the three-dimensional computer model.

25. Apparatus according to claim 24, wherein the texture map generator is operable to generate the texture data for each respective texture map such that the contribution of image data from the image corresponding to the texture map is greater than the contribution of image data from any other respective image for each part of the three-dimensional computer model that is visible in the corresponding image.

26. Apparatus according to claim 19, wherein the texture map generator is operable to generate the texture data for each respective texture map such that the texture data for parts of the three-dimensional computer model that are visible in the corresponding image is determined solely from the image data in the corresponding image.

27. Apparatus according to claim 24, wherein the texture map generator is operable to generate each texture map by;
   calculating a respective measure of similarity of the view of the three-dimensional computer model available in the image corresponding to the texture map with the view of the three-dimensional computer model available in each other image; and
   generating texture data for the texture map from the images in dependence upon the calculated measures.

28. Apparatus according to claim 22, wherein the texture map generator is operable to generate texture data for each respective texture map by combining image data from the images in proportions dependent upon the calculated measures.

29. Apparatus according to claim 19, wherein the three-dimensional computer model comprises a mesh of polygons, each polygon defining a part of the three-dimensional computer models and wherein the texture map generator is operable to generate each texture map as data defining a two-dimensional array of texels together with colour component values for the texels and positions within the array of the vertices of the polygons comprising the parts of the three-dimensional computer model for which the texture map stores texture data.

30. Apparatus according to claim 19, wherein the three-dimensional computer model comprises a plurality of unconnected points in three-dimensional space, each point defining a part of the three-dimensional computer model, and wherein the texture map generator is operable to generate each texture map as data defining colour component values for each point comprising a part of the three-dimensional computer model for which the texture map stores texture data.

31. Apparatus for generating texture data for use in rendering an image of a three-dimensional computer model, the apparatus comprising:
   a data store configured to store data defining a three-dimensional computer model of the surface of an object, image data defining a plurality of different images of the object, and data defining the position and direction of each image and the three-dimensional computer model; and
   a texture map generator operable to process the data to generate a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view.

32. Apparatus for rendering an image of a three-dimensional computer model comprising:
   a data receiver operable to receive data defining a viewing position and direction from which an image is to be rendered;
   a texture map selector operable to select a texture map for rendering the image from among a plurality of texture maps, wherein each texture map is associated with a camera viewing position and direction and defines texture data for parts of the three-dimensional computer model that are visible from the associated viewing position and direction and at least some parts of the three-dimensional computer model that are not visible from the associated viewing position and direction, and wherein the texture map selector is operable to select the texture map for rendering in dependence upon the received viewing direction and the viewing directions associated with the texture maps; and
   an image renderer operable to render an image of the three-dimensional computer model from the received viewing position and direction using texture data from the selected texture map.

33. Apparatus for processing data defining a three-dimensional computer model of the surface of an object, image data defining a plurality of different images of the object, and data defining the position and direction of each image and the three-dimensional computer model, to generate texture data from the images for use in rendering an image of the three-dimensional computer model, the apparatus comprising:
   means for generating a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view.

34. Apparatus for generating texture data for use in rendering an image of a three-dimensional computer model, the apparatus comprising:

means for storing data defining a three-dimensional computer model of the surface of an object, image data defining a plurality of different images of the object, and data defining the position and direction of each image and the three-dimensional computer model; and means for processing the data to generate a plurality of texture maps, each texture map being associated with a respective view of the three-dimensional computer model and each texture map defining texture data for parts of the three-dimensional computer model that are visible in the corresponding view and at least some parts of the three-dimensional computer model that are not visible in the corresponding view.

35. Apparatus for rendering an image of a three-dimensional computer model comprising:

means for receiving data defining a viewing position and direction from which an image is to be rendered;

selecting means for selecting a texture map for rendering the image from among a plurality of texture maps, wherein each texture map is associated with a camera viewing position and direction and defines texture data for parts of the three-dimensional computer model that are visible from the associated viewing position and direction and at least some parts of the three-dimensional computer model that are not visible from the associated viewing position and direction, and wherein the selecting means is operable to select the texture map for rendering in dependence upon the received viewing direction and the viewing directions associated with the texture maps; and means for rendering an image of the three-dimensional computer model from the received viewing position and direction using texture data from the selected texture map.

* * * * *